Patented Mar. 20, 1945

2,371,641

UNITED STATES PATENT OFFICE 2,371,641

PROCESS FOR REMOVING THE SULPHOXY GROUP FROM ORGANIC COMPOUNDS CONTAINING THIS GROUP

Ralph Mozingo, Elizabeth, N. J., assignor to Merck & Co., Inc., Rahway, N. J., a corporation of New Jersey No Drawing. Application July 16, 1943, Serial No. 495,071

10 Claims. (Cl. 260—668)

This invention relates in a general sense to processes for the synthesis of organic chemical compounds, and more particularly, is concerned with a method for removing a sulphoxide group from certain organic compounds containing this group to produce corresponding hydrocarbons or substituted hydrocarbons according to the following, wherein R and R' are aliphatic or aromatic groups:

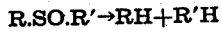

R.SO.R'→RH+R'H

In accordance with the present invention, certain aromatic or aliphatic sulphoxides or the like, are treated with a pyrophoric nickel catalyst such as Raney nickel, whereby the compounds are molecularly cleaved, the sulphoxide group is removed from the residue of the molecule, and the corresponding hydrogenated compounds are produced. It is preferred to conduct the operations at an elevated temperature, for example, by refluxing the sulphur-containing substance alone or in the presence of a solvent, with the catalyst. However, if desired, the reaction can be performed at or slightly above ordinary room temperature provided additional time for reaction is allowed.

The pyrophoric nickel catalyst is used in practicing the process according to the present invention can be prepared as described in U. S. Patents 1,563,587 of December 1, 1925; 1,628,190 of May 10, 1927, or 1,915,473 of June 27, 1933 or by any other similar procedure capable of yielding a body consisting predominantly of finely divided nickel with hydrogen, the latter being present, as a metallic hydride, or merely adsorbed on the surface of the mass. When the catalyst is prepared as described in the above-mentioned patents, it is preferred to modify the procedure there described carrying out the final heating of the intermediate nickel-aluminum alloy in an alkaline solution at a temperature of 50–80° C. for one hour instead of at the somewhat higher temperatures specified in the patents.

The following example illustrates a method of carrying out the present invention, but it is to be understood that this example is given by way of illustration and not of limitation.

Example

About 2 g. of diphenylsulphoxide

(C₆H₅.SO.C₆H₅)

in approximately 100 cc. of ethanol and 35 cc. of water are refluxed about 5 hours with 25–30 g. of Raney nickel catalyst. After dilution with water, the mixture is distilled to obtain the product, benzene.

It will be apparent that the principles of this invention can be applied, with appropriate modifications that are within the expected skill of persons versed in this art, to symmetrical or asymmetrical aromatic or aliphatic sulphoxides. The appended claims embrace the process of the present invention thus modified.

What is claimed is:

1. The process that comprises reacting a pyrophoric nickel catalyst and an organic compound containing a sulphoxide group.

2. The process that comprises reacting Raney nickel and an organic compound containing a sulphoxide group.

3. The process that comprises reacting at an elevated temperature a pyrophoric nickel catalyst and an organic compound containing a sulphoxide group.

4. The process that comprises reacting at an elevated temperature and in the presence of a solvent a pyrophoric nickel catalyst and an organic compound containing a sulphoxide group.

5. The process that comprises refluxing together in the presence of a substantially inert solvent a pyrophoric nickel catalyst and an organic compound containing a sulphoxide group.

6. The process that comprises reacting at an elevated temperature Raney nickel and an organic compound containing a sulphoxide group.

7. The process that comprises reacting at an elevated temperature and in the presence of a solvent Raney nickel and an organic compound containing a sulphoxide group.

8. The process that comprises refluxing together in the presence of a substantially inert solvent Raney nickel and an organic compound containing a sulphoxide group.

9. The process that comprises treating an organic compound containing a sulphoxide group with a pyrophoric nickel catalyst to cause removal of the sulphoxide group and satisfaction of valence bonds, formerly linked to the sulphur atom, with hydrogen.

10. The process that comprises treating an organic compound containing a sulphoxide group with Raney nickel catalyst to cause removal of the sulphoxide group and satisfaction of valence bonds, formerly linked to the sulphur atom, with hydrogen.

RALPH MOZINGO.